Feb. 10, 1970    J. L. WISHART    3,495,214
VEHICLE AND EQUIPMENT LIQUID LEVEL INDICATOR
Filed Oct. 19, 1966

INVENTOR.
JOSEPH L. WISHART
BY Elliott & Pastoriza
ATTORNEYS

United States Patent Office 3,495,214
Patented Feb. 10, 1970

3,495,214
VEHICLE AND EQUIPMENT LIQUID LEVEL INDICATOR
Joseph L. Wishart, 303 Prospect Drive,
Oakview, Calif. 93022
Filed Oct. 19, 1966, Ser. No. 587,842
Int. Cl. H01h 29/00, 29/30; B60q 9/00
U.S. Cl. 340—59                                                                                                          6 Claims

ABSTRACT OF THE DISCLOSURE

An indicator in the form of first and second light bulb means is provided and is suitably mounted in or on a vehicle or equipment for indicating the liquid level of brake fluid or other liquid in the vehicle or equipment. When the level is satisfactory or safe, the first light bulb means is energized. When the liquid level drops below a safe value, the first bulb is extinguished and the second bulb means is lit. By using transistors in the electrical circuitry, a flickering or flashing type indication is provided for the second light bulb means to attract the driver's attention.

---

This invention relates generally to liquid level indicators and more particularly, to an improved electrically operated liquid level indicator for vehicles to indicate the drop in level below a given safe level of a liquid, such as the brake fluid in the brake drum fluid reservoir.

Liquid level indicating devices for indicating the level of brake fluid have been provided heretofore. In many instances, an indicator such as a light is caused to be energized when the fluid level in question drops below a predetermined value to provide a warning for the driver. Such a light is often located on the dashboard of the vehicle. A problem with a simple light indicator however arises because of possible confusion on the part of the driver with other indicator lights on the dashboard. Particularly is the problem aggravated in large vehicles such as buses or trucks wherein there are provided many different indicating lights. During night driving, a steady light indication may easily go unnoticed for a considerable length of time.

In addition to the foregoing, presently available indicators are generally incorporated into the vehicle at the factory. The devices themselves are relatively complicated and expensive. As a consequence, they have been used only on more expensive vehicles or in special custom built automobiles and the advantages and safety inherent in such device are not available to the large number of average automobile drivers.

Further, in many presently available electrically operated indicators, there is no convenient means of testing the indicator to make sure that it is functioning properly. Should an open circuit occur, the indicator lights or sounds if used as an indication will not be energized when the liquid level reaches a dangerously low value.

With the foregoing considerations in mind, it is a primary object of this invention to provide a vastly improved liquid level indicator preferably for indicating brake fluid reservoir levels, in which the above problems are overcome.

More particularly, it is an object to provide a liquid level indicator having a unique light indicating system which will more readily attract a driver's attention than a simple steady shining light and thus minimize the risk of confusing the indicators with normally present lights on the dashboard.

Another important object of this invention is to provide a liquid level indicator which is extremely compact, relatively inexpensive to manufacture, and which may be easily installed on any existing vehicle without necessitating any major modifications all to the end that for the first time this safety type of indicator may be economically used by large numbers of people.

Another object is to provide a simple electrically operated indicator for indicating liquid levels which may be very easily tested to assure that all of the electrical circuit portions of the indicator are functioning properly.

Briefly, these and other objects and advantages of this invention are attained by providing an indicating means in the form of first and second light bulb means of different colors such as green and red. The first and second bulb means are connected in series between a source of electrical energy such as the automobile battery and ground.

Cooperating with the indicator is a circuit means connected to the indicator and to a suitable liquid level probe member designed to be inserted in the particular fluid reservoir, the level of which is to be indicated.

The circuit itself includes only two transistors connected in such a manner as to provide current paths between the source of electrical energy and ground in response to a change in condition of the liquid level beyond a pre-assigned safe level. The arrangement is such that the first bulb means will be lit to indicate that the liquid level is at a safe value and when the level drops below the safe level, the first bulb means is extinguished and the second bulb means is lit.

The action of the two transistors in the circuit in conjunction with the particular light bulbs employed results in a flickering or flashing type indication when the second set of lights indicating a dangerous condition are lit. As a result, a driver's attention is much more readily attracted than would be the case for steady lights. Additionally, the circuit includes a simple testing button type switch so that the driver at any time may simulate a dangerous condition to make sure that the second set of lights are operable.

The entire unit is designed to be temporarily or, if desired permanently, held on the dashboard of a vehicle without requiring any modification of the dashboard structure itself. As a result, the unit may be sold as a separate structure which may easily be attached to a vehicle by the owner of the car or by a service station attendant.

A better understanding of the invention will be had by now referring to a preferred embodiment thereof as illustrated in the accompanying drawings in which.

Figure 1:
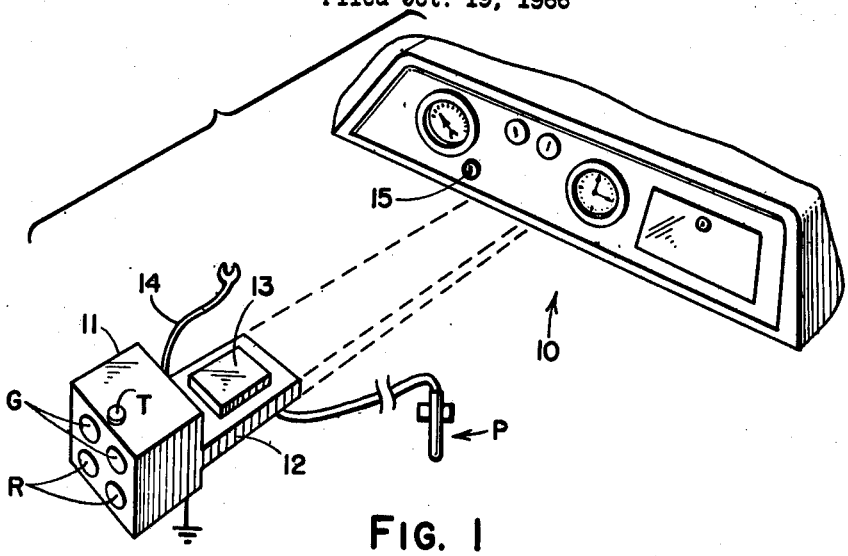
FIGURE 1 is a schematic perspective exploded view showing the basic indicating portion of the unit preparatory to securing the same to a dashboard of an automobile.

Referring first to FIGURE 1, there is shown a dashboard 10 for a vehicle such as a truck, bus, or automobile. The liquid level indicating part of the device is shown exploded away from the view at 11 and includes a mounting flange 12 which may incorporate a permanent magnet 13. With this arrangement, the unit 11 may be secured to the dashboard, the magnet 13 gripping the under metal part of the board.

As shown, the unit includes a lead out wire 14 for connection to a source of electrical energy such as the car battery. Preferably, this connection is effected through the ignition switch 15 of the vehicle so that the device is not operative unless the ignition switch is turned on.

The unit also includes a probe P for insertion in a fluid reservoir.

As shown in FIGURE 1, the front of the unit 11 includes first and second indicating means in the form of dual light bulb means designated G and R respectively. These sets of bulbs are of different colors and in the embodiment described, the upper set of two bulbs is green and the lower set of two bulbs is red. The outer casing of the unit 11 is electrically grounded as indicated.

In the operation of the structure of FIGURE 1, the unit is mounted on the dashboard and the wire 14 connected in series with the ignition 15 as described. In addition, the probe P is inserted in a fluid reservoir such as the reservoir for the brake drum fluid in a manner such that should the fluid level drop below a predetermined value, the probe will be free of the fluid. The circuit within the unit 11 is designed to cause the green bulbs to be energized when the liquid level is in a safe condition. When the liquid level drops below a safe value to free the probe, the green lights are extinguished and the red lights will be lit.

The structure 11 may also include a simple test switch button T. When this button is depressed, a condition of the probe being free of the liquid is simulated so that the driver may ascertain that the circuit is working properly by depressing the button T and observing whether or not the green lights are extinguished and the red lights lit.

Figure 2:
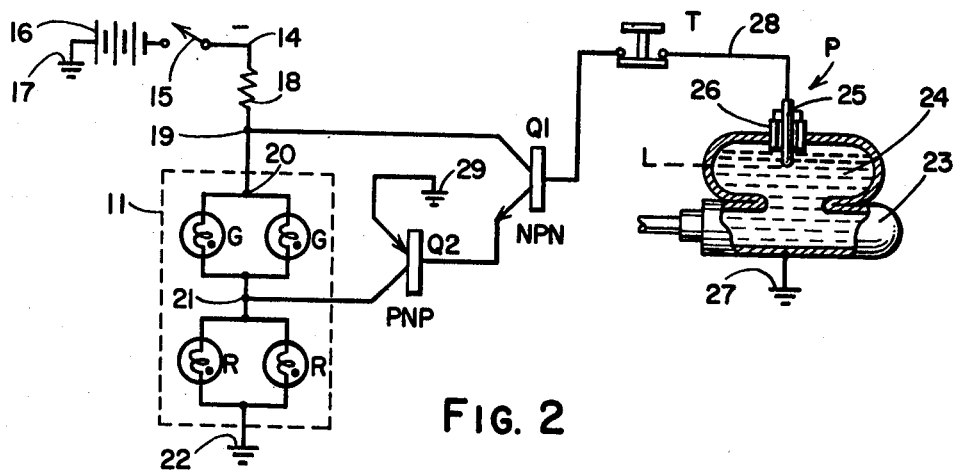
FIGURE 2 is a schematic circuit diagram of a first embodiment of the invention for use with automobiles having negative battery voltage; and, FIGURE 3 is a view similar to FIGURE 2 showing a slightly modified circuit for use with automobiles having positive battery voltage.
Figure 3:
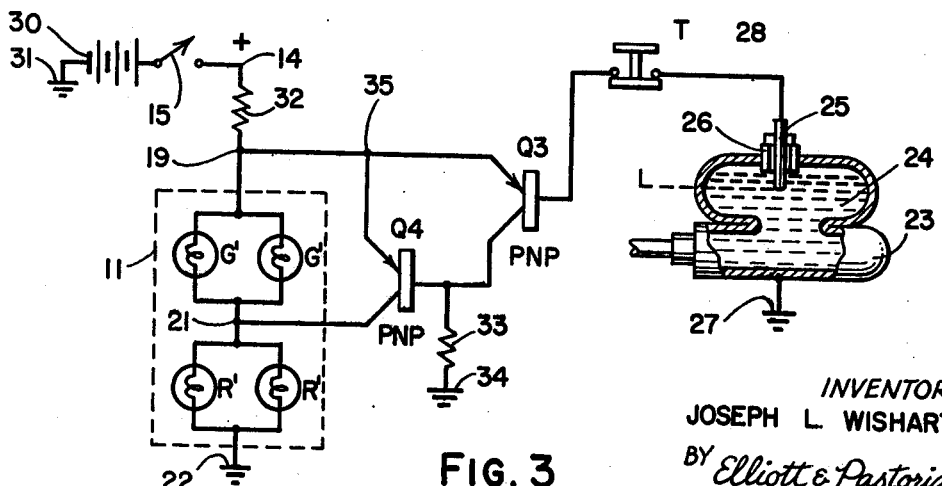

Circuits for carrying out the foregoing operation in accordance with the invention will not be described in detail with respect to FIGURES 2 and 3.

In FIGURE 2, the various components common to those described in FIGURE 1 are designated by the same numerals. Referring to the upper left hand portion of the circuit, it will be noted that the lead 14 in series with the ignition switch 15 is energized from the negative side of the automobile battery schematically shown at 16. The other side of the battery is grounded at 17. A suitable current limiting resistance may be used at 18 so that a reduced voltage for operating the indicator is provided at a junction point 19.

As shown in FIGURE 2, a lead from the junction point 19 connects to a junction point 20 to one side of the first set of light bulbs G shown connected in parallel with each other. The other side of these light bulbs terminates in a junction point 21 which in turn connects to the second set of light bulbs R connected in parallel with each other. The other sides of the bulbs R connect to ground at 22. The first and second sets of light bulbs are thus connected in series between the source junction 19 and ground.

Referring now to the right portion of FIGURE 2, there is schematically indicated a brake fluid reservoir 23 including fluid 24 receiving the probe P as shown at 25. The extent of insertion of the probe 25 into the fluid 24 may be adjusted by suitable bushings 26 which permits sliding movement of the probe 25 and yet maintains a fluid tight seal. The reservoir itself is electrically grounded at 27 so that the fluid in the reservoir is at electrical ground.

A lead 28 connects from the probe 25 through the test switch T, which is normally closed, to the base of an NPN transistor Q1. The collector terminal of the NPN transistor connects directly to the junction point 19 and its emitter terminal connects to the base of a PNP transistor Q2. The emitter terminal of the transistor Q2 is grounded at 29 and its collector terminal connects to the junction point 21 between the series connected sets of light bulbs G and R.

In the operation of the circuit of FIGURE 2, assume that it is desired to indicate the dropping of the liquid 24 in the reservoir 23 below a given level L. In this case, the probe 25 will be inserted into the liquid to the level L such that when the liquid level falls below the level L, the probe 25 will be free of the liquid.

With the probe in the fluid as shown and the ignition switch 15 closed, a ground path is provided through the fluid to the base of the transistor Q1. Since the potential of ground on the base of the transistor Q1 is actually positive with respect to its collector potential provided by the battery at the source 19, the transistor Q1 conducts to provide at the base of the transistor Q2 a negative potential. This negative potential on the transistor Q2 switches the transistor Q2 on to cause it to conduct thereby providing a current path from the junction point 21 to ground at 29. The light bulbs R are essentially shorted out of the circuit and the light bulbs G will be energized from the battery source through the ignition 15, current limiting resistance 18, junction point 19, and junction points 20 and 21 through the transistor Q2 to ground at 29. In this circuit, the transistor Q1 functions as an amplifier so that the relatively weak current pass provided through the fluid from ground 27 to the base of the transistor Q1 is sufficient to provide the necessary bias on the transistor Q2 to keep it in an "on" or conducting condition.

If now the fluid in the chamber 24 drops below the level L to remove the probe 25 from the fluid, the positive voltage from ground on the base of Q1 relative to its collector voltage will be removed with the result that Q1 will be cut off thereby removing the negative bias on the transistor Q2. As a result, transistor Q2 is cut off so that current must now pass through the light bulbs R to ground at 22. The resistance of the light bulbs G in the embodiment of FIGURE 2 is small compared to the resistance of the light bulbs R. As a result, considerably more current is required to cause the light bulbs G to glow than is required for the light bulbs R. The current available through the light bulbs is governed by the resistance 18 and the series resistances of the two sets of light bulbs and this current works out to values sufficient to energize the light bulbs R but not of sufficient value to energize the light bulbs G. Thus the light bulbs G provide a current pass to the light bulbs R and these latter bulbs only will be lit.

In the actual operation, the liquid will not all of a sudden be free of the probe 25 but will make intermittent contact therewith when its level is in the neighborhood of the level L. As a result, there will be make and break contacts with the probe 25 causing a make and break rapid switching on and off of the transistor Q1 and thus the transistor Q2. The various light bulbs G and R will thus flash at random time intervals. The light bulbs G will only be completely turned off when the liquid in the chamber is sufficiently below the level L such that it will not make contact with the probe 25. At this time, the light bulbs R would ordinarily shine in a steady manner, but in the preferred embodiment, these bulbs include internal flashing means which will result in a sporadic flashing of the two bulbs.

The foregoing is an important feature of this invention as it provides a flashing type indication which is completely arbitrary depending upon the motion of the automobile or other vehicle and thus an attention attracting warning signal results. Further, the arrangement will indicate the condition of the liquid as approaching the unsafe level before the level of the liquid actually does assume an unsafe condition so that sufficient time is permitted the driver to drive safely to a suitable station to have the fluid reservoir serviced. The red bulbs, as described, will continue to flicker in a sporadic manner to thus provide a continuing indication of the condition.

In order to provide a simple check as to the operation of the circuit, the driver may depress the test button T. This operation simply opens the line 28 to simulate the same condition as occurs when the probe 25 is free of the liquid. Thus, upon pressing the button T, if the circuit is operating properly, the green lights will be extinguished and the red lights energized.

Referring now to FIGURE 3, there is shown a second embodiment of the invention similar to the first embodiment but for use with a vehicle in which the battery voltage is positive with respect to ground. Elements in the circuit of FIGURE 3 which are identical to those employed in the circuit of FIGURE 2 are provided with the same numerals.

In FIGURE 3 the battery for the vehicle is shown at 30 with one side grounded at 31 and its other side providing a positive voltage through the ignition switch 15 to the junction point 14. A different sized current limiting resistance 32 is shown between the junction points 14 and 19. It is to be understood that the current limiting resistances 18 of FIGURE 2 and 32 of FIGURE 3 may be suitably adjusted depending upon the actual voltage provided by the battery. Thus, different resistances will be used depending upon whether the battery is a six volt battery or a twelve volt battery.

A further difference in the circuit of FIGURE 3 resides in the indicating lamps themselves. These bulbs are indicated as G' and R' respectively. They provide green and red lights to indicate safe and dangerous conditions as in FIGURE 2 but are distinguished therefrom in that the resistances of the green bulbs G' are considerably higher than the resistances of the red bulbs R'.

In the embodiment of FIGURE 3, the line 28 connects to the base of a first PNP type transistor Q3. The collector of this transistor in turn connects to the base of a second PNP transistor Q4 this base also being connected through a biasing resistance 33 to ground at 34. The emitters of the first and second transistors Q3 and Q4 are connected together at 35 and to the junction point 19. The collector terminal of the transistor Q4, as in the case of FIGURE 2, connects to the junction point 21 between the series connected sets of light bulbs.

In the operation of the circuit of FIGURE 3, when the probe 25 is immersed in the liquid 24, a path through ground is provided through the lead 28 to the base of the transistor Q3. The bias on the transistor Q3 is now a negative voltage since positive battery is applied to its emitter. Since this transistor is of the PNP type, this negative bias at the base of the transistor Q3 will turn on the transistor and thereby provide a positive bias on the base of the transistor Q4 from the positive voltage source at junction 19. Transistor Q4 will therefore be cut off or held in an open condition as long as transistor Q3 is conducting. As a result, current may now pass through the current limiting resistance 32, junction point 19 and the two sets of bulbs G' and R' to ground 22, there being no current path from the junction point 21 to ground. The green bulbs will thus be energized or lit. Because the green bulbs now have a high resistance compared with the red bulbs, there is not sufficient current flow to light the red bulbs.

When the liquid 24 in the reservoir drops below the level L, the probe 25 is free of the liquid and ground is removed from the base of the transistor Q3. As a consequence, transistor Q3 is cut off thereby removing the bias to the base of the transistor Q4. The base of transistor Q4 is now biased with a negative voltage from the ground 34 through the resistance 33 so that transistor Q4 is now turned on or energized providing a current path from the junction point 21, through the transistor and junction point 35 to the source of positive potential 19. The green lights are now essentially shorted out of the circuit by the transistor Q4 and positive potential will pass through the transistor and directly through the red bulbs to ground 22 thereby causing these bulbs to light.

As in the case of the embodiment of FIGURE 2, as the liquid level approaches the end of the probe 25, there will be intermittent contact with the probe resulting again in a desired flashing when the transition point occurs between the time that the green bulbs are to be de-energized and the red bulbs energized.

In the circuit of FIGURE 3, operation of the test button T will again open the line 28 and thus simulate the condition of the liquid level dropping below the end of the probe 25. Thus, the circuit may be tested in the same manner as the embodiment of FIGURE 2.

From the foregoing description, it will be evident that the present invention has provided a greatly improved liquid level indicating device which may be readily attached to conventional automobiles and used with conventional batteries in these automobiles. Further, it will be evident that no major modification of the automobile is necessary, the indicating unit itself simply being held to the dashboard in any desired position by the magnet. In addition, the feature of providing a simple pushbutton test switch assures greater safety in that the operator can always determine that the circuit is operating correctly.

What is claimed is:

1. An electrical liquid level indicator comprising, in combination: probe means for immersion into an electrically grounded liquid a given distance to define an electrical path between said probe means and ground; light indicating means; a source of electrical energy; and circuit means connected to said probe means, light indicating means, and source of electrical energy, said circuit means being responsive to the breaking of electrical contact of said probe means with said liquid as a result of the lowering of the level of said liquid beyond the end of said probe means, to thereby effect lighting of at least a portion of said light indicating means, said light indicating means being connected between said source of electrical energy and ground and including first and second light bulb means connected in series with each other, said circuit means connecting to the series connection between said first and second light bulb means, said first light bulb means having a resistance different from said second light bulb means, and said circuit means defining current paths enabling lighting and extinguishing of said first and second light bulb means when said probe is immersed in said liquid and removed from said liquid, respectively, whereby lighting of said first light bulb means indicates that the level of said liquid is above the end of said probe, said portion of said light indicating means lit when said probe is free of said liquid constituting said second light bulb means.

2. An indicator according to claim 1, in which said first light bulb means comprises two bulbs in parallel for providing light of a first color and said second light bulb means comprises two bulbs in parallel for providing light of a second color different from said first color.

3. An indicator according to claim 1, in which the resistance of said first light bulb means is less than the resistance of said light bulb means, and source of electrical energy is negative with respect to ground, and in which said circuit means includes an NPN transistor having its base terminal connected to said probe and its collector terminal connected to said source of electrical energy; a PNP transistor having its base terminal connected to the emitter terminal of said NPN transistor, its collector terminal connected to said series connection between said first and second light bulb means, and its emitter terminal connected to ground, whereby when said probe is immersed in said liquid, said NPN transistor conducts to provide a negative bias voltage from said source to the base of said PNP transistor to cause said PNP transistor to conduct thereby providing a direct current path to ground from said first light bulb means to light the same, and whereby when said probe is free of said liquid, said NPN transistor is cut off to remove said negative bias from said PNP transistor to cut off said PNP transistor and thereby remove said direct path to ground such that current from said source passes through said second light bulb means to light the same, said current being insufficient to light said first light bulb means.

4. An indicator according to claim 1, in which the resistance of said first light bulb means is greater than the resistance of said second light bulb means, said source of electrical energy is positive with respect to ground, and in which said circuit means includes a first PNP transistor having its base connected to said probe and its emitter terminal connected to said source; a second PNP transistor having its base connected to the collector terminal of said first PNP transistor and through a resistance to ground, its collector terminal connected to said series connection between said first and second light bulb means, and its emitter terminal connected to said source of electrical energy, whereby when said probe is immersed in said liquid, said first PNP transistor provides a positive bias on the base of said second PNP transistor to hold said second PNP transistor off whereby current from said source passes through said first light bulb means, said current being insufficient to light said second light bulb means, and whereby when said probe is free of said liquid, said first PNP transistor is turned off and said second PNP transistor is biased from ground through said resistance to provide a direct current path from said source to said second light bulb means to thereby light said second light bulb means.

5. An indicator according to claim 1, in which said circuit means includes a normally closed test switch in series with said probe, opening of said switch simulating an electrical condition corresponding to a drop in the level of said liquid below the end of said probe.

6. An indicator according to claim 1, in which said second light bulb means includes internal flashing means such that when energized, said second light bulb means will flicker in a sporadic manner.

References Cited

UNITED STATES PATENTS 3,333,258   7/1967   Walker et al. _____ 340—244

ALVIN H. WARING, Primary Examiner

U.S. Cl. X.R.

73—304; 200—61.05; 340—244